Jan. 13, 1931.   J. H. MOTT ET AL   1,788,687
OAT HULLER
Filed July 9, 1928   2 Sheets-Sheet 1
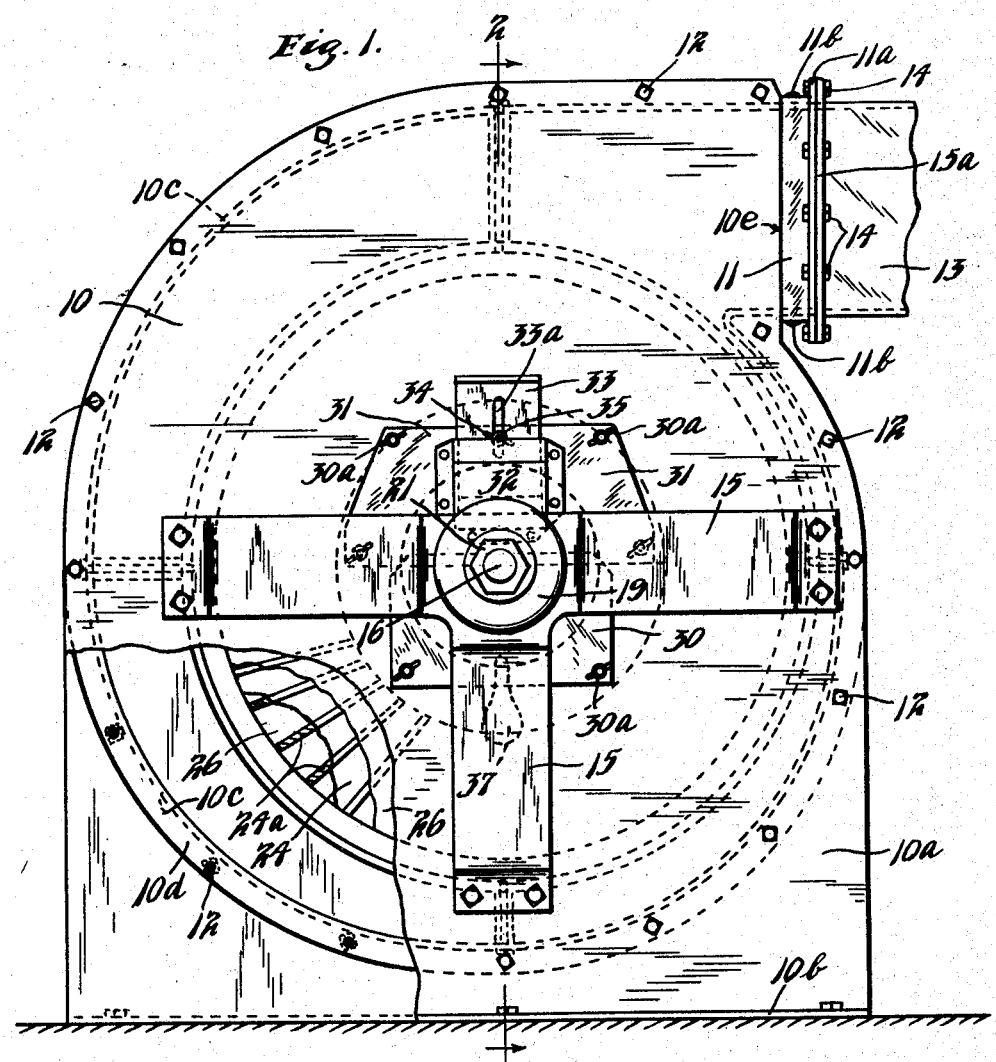
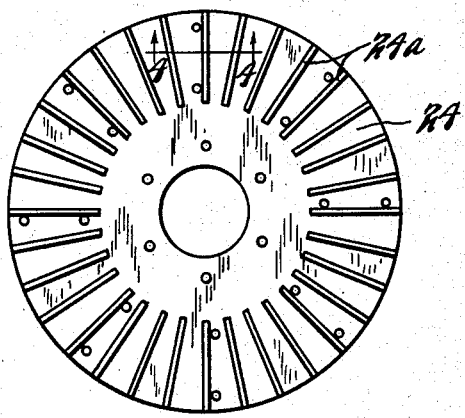
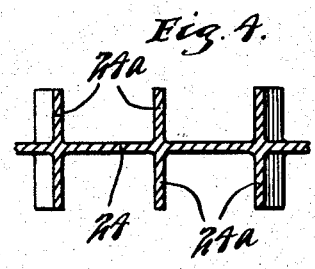
INVENTORS.
JAMES H. MOTT.
CARL C. GRAY.
BY THEIR ATTORNEYS

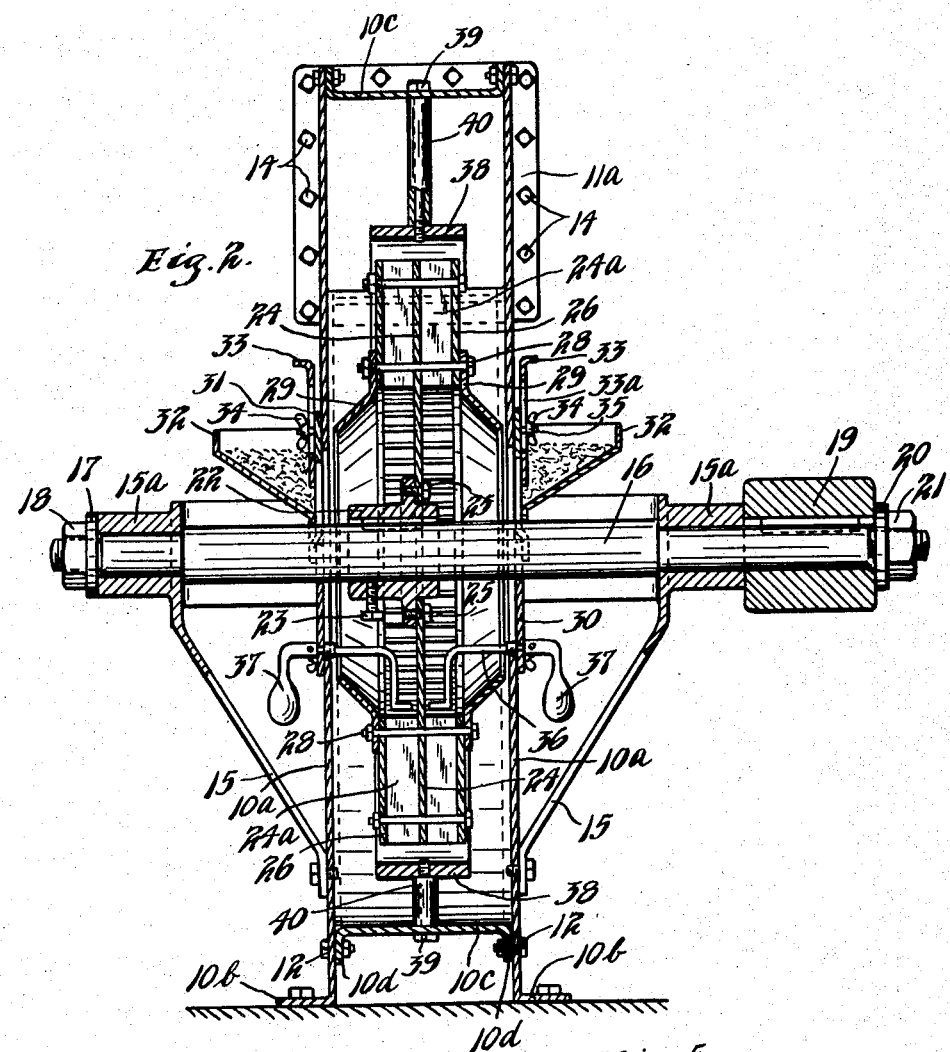
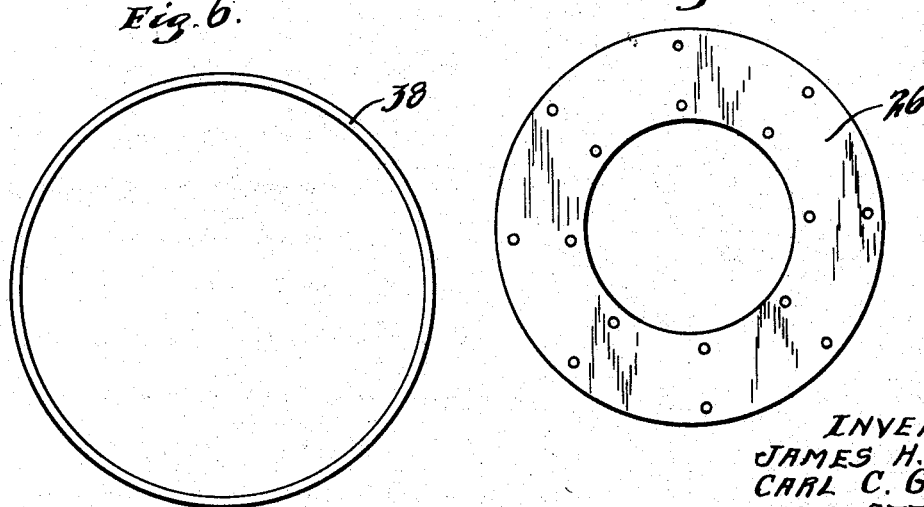

Patented Jan. 13, 1931

1,788,687

UNITED STATES PATENT OFFICE

JAMES H. MOTT AND CARL C. GRAY, OF MINNEAPOLIS, MINNESOTA

OAT HULLER

Application filed July 9, 1928. Serial No. 291,194.

This invention relates to a machine for hulling oats or similar grain and which can also be used for cracking or comminuting corn and other grain or stock food material. Oats are now used largely as a stock food and it is desirable that the oats be hulled before being fed or mixed with other feeds to form a mixed feed. It is also desirable to run other grain or stock food such as corn or alfalfa hay through a hulling machine for cracking or comminuting the same. Such cracked or comminuted stock feed is commonly used in making rationed feeds.

It is an object of this invention, therefore, to provide a very simple and efficient hulling or comminuting apparatus comprising a rotary member having ribs at either side thereof which receives and distributes the material.

It is a further object of the invention to provide a simple and efficient machine for hulling or operating upon a stock feed comprising a casing, a disk disposed therein having blades or flutes at either side for distributing the material, a ring extending about said disk against which the material is projected, and an outlet conduit leading from said casing, said ring extending across the opening into said outlet conduit.

It is a further object of the invention to provide a machine for hulling or otherwise operating on stock feed material comprising a casing having substantially vertical sides, a shaft extending therethrough, a disk carried on said shaft between said sides, having blades or flutes thereon, an annular disk overlying said flutes, a ring surrounding and spaced from said disks against which the material is thrown, an outlet conduit leading tangentially from said casing, the circumferential wall of said casing extending from a point adjacent said ring at one side of said outlet and diverging constantly therefrom to the other side of said conduit.

These and other objects and advantages of the invention will be fully set forth in the following description made in connection with the accompanying drawings, in which like reference characters refer to similar parts throughout the several views and in which:—

Fig. 1 is a view in side elevation of the machine, certain portions being broken away and others shown in vertical section.

Fig. 2 is a vertical section taken on line 2—2 of Fig. 1 as indicated by the arrows;

Fig. 3 is a face view of one of the disks used;

Fig. 4 is a section taken on line 4—4 of Fig. 3 as indicated by the arrows, and shown on an enlarged scale;

Fig. 5 is a face view of the one of the covering disks used; and

Fig. 6 is an edge view of the hulling ring used.

Referring to the drawings, a machine is shown comprising a casing 10 and while this casing may be variously made, in the embodiment of the invention illustrated it is shown as comprising a pair of substantially vertically disposed flat plates 10a having their lower sides rectangular and having their bottom edge portions bent outwardly substantially at a right angle to form attaching flanges 10b. The side members 10a are connected by the circumferential wall 10c also illustrated as made from sheet material having flanges 10d at the sides thereof directed outwardly and bolted to the members 10a by the circumferentially spaced headed and nutted bolts 12. The plate 10c is continued some distance from the edge 10e of the plates 10a at the top and is reversely bent to extend parallel with said top portion at the lower portion of edge 10e. A short conduit of rectangular shape having a flange 11a at its outer end extending at right angles to the sides thereof is fed over the projecting portions of plate 10c and connected thereto by the rivets 11b. The sides of conduit 11 abut the edges 10e of plates 10a. A conduit 13 of a shape similar to conduit 11 is positioned in alinement therewith and has a flange 13a which is bolted to the flange 11a by the spaced headed and nutted bolts 14, conduits 11 and 13 forming a discharge conduit for said casing. Brackets 15 having downwardly extending and horizontally extending arms are bolted to each plate 10a, said arms carrying bearings 15a spaced from the plates 10a, in which bearings is journaled a shaft 16. The shaft 16 is threaded at one end and has thereon a washer 17 engaging one of the bearings 15a, which washer is held in place by a nut 18 threaded on said shaft. A pulley 19 is keyed to shaft 16 adjacent the other bearing 15a, also held in place by a washer 20 engaged by a nut 21 threaded on the other end of said shaft. A hub member 22 is keyed to shaft 16 between plates 10a and also held by a set screw 23. Said hub member has a circumferential flange and a disk 24 has a central opening embracing hub 22 and bolted to said flange by the circumferentially spaced headed and nutted bolts 25. The disk 24 has ribs 24a thereon at both sides thereof, which ribs are separated at their inner ends and diverge outwardly therefrom to the edge of the disk, the inner ends of said ribs being disposed some distance from the opening through said disk. Annular plates 26 are disposed at either side of the disk 24, which overlie and cover the ribs 24a, said disk being of the same diameter of the disk 24 and having the edge of the opening therethrough disposed at the inner ends of the ribs 24a. The disks 26 have bolted thereto by the circumferentially spaced headed and nutted bolts 28, the frusto-conical members 29 which have their smaller ends extending outwardly to a point in close proximity to the side plates 10a. The side plates 10a have openings therein about the shaft 16 and plates 30 are secured to the outer side of plates 10a by the wing nuts 30a. The plates 30 extend substantially to the axis of shaft 16, having recesses in which said shaft is disposed. Other plates 31 are secured to said plates 10a above shaft 16, having their lower edges offset as shown in Fig. 2 to overlap the upper edges of plates 30. The plates 31 carry hoppers 32 and have openings therethrough in alinement with the hoppers whereby material can pass to the inner sides of said plates 10a, said openings being adapted to be closed more or less by the slides 33 adjustably held in relation to the plate 30 by a wing nut 34 engaging a bolt 35 which extends through a slot 33a in the plate 33. The upper edge of plate 33 is bent outwardly to form a handle means. Shafts 36 are journaled in the lower portions of plates 30, the same extending through the openings in disk 26 and being bent substantially at a right angle to have their ends disposed closely adjacent the inner ends of ribs 24a, the terminal ends being also bent at a right angle to extend along the ends of said ribs. The shafts 36 have secured to their outer ends the weight arms 37 which hold said shafts in position by gravity. A ring 38 surrounds disks 24 and 36, being spaced a short distance outwardly thereof and having a width to extend a short distance beyond the outer edges of said disks and ring 38. Bolts 39 extend through the plate 10c and are threaded at their inner ends into the ring 38 for holding said ring in position, said bolts being surrounded by sleeves 40 disposed between plate 10c and said ring.

In operation, the oats to be hulled or the other material to be treated, is placed in the hoppers 32. The pulley 19 will be driven at high speed by a suitable belt, from a motor, so that disks 24 and 36 are revolved at high speed. Plates 33 will be adjusted to give the desired feed of material and the material will pass through the side plates 10a and into the members 29 by which it will be guided into the space between disk 24 and the disks 26 and between the ribs 24a. The material is evenly distributed between the disks 24 and owing to the rotation of these disks, it is thrown outward at high velocity against the ring 38. The material strikes the ring 38 with great force and the impact effectively hulls the oats. The material passes out at each side of the ring 38 and is discharged at high velocity through the conduits 11 and 13. The rotation of disks 24 and 26 with the ribs 24a causes a powerful blast of air to pass out of conduit 13 which carries the material with it. It will be noted that the plate 10c at the lower side of the discharge conduit 11 is quite close to ring 38 but diverges from said ring as it passes thereabout and is at its greatest distance from it at the top of conduit 11. It has been found in practice that this structure gives a greatly improved action in the machine, increases the capacity thereof and results in a uniform action against the ring 38 so that the wear on said ring is uniform throughout the circumference thereof. The machine as stated, has also been found to be very efficient for cracking corn or other grain and comminuting stock food such as alfalfa. It is quite important that the spaces between the inner ends of ribs 24a be kept clear. If material lodges between these ends and the opening is closed up, the machine becomes unbalanced and the high speed of rotation causes the disks to roar. To keep the inner ends of the disk clear, the members 36 are provided. If any material or foreign object should stick at the ends of the ribs, it will be struck by members 36 and dislodge. It will be noted that the members 36 can swing upwardly and will be returned to normal position by the weight arms 37.

From the above description it is seen that applicants have provided a very simple and efficient machine for hulling oats and operating on other stock food material. The structure is quite compact and of duplex arrangement, thus giving a large capacity. The machine operates continuously, and the oats treated is very effectively hulled. The machine has been amply demonstrated in actual practice and is being commercially made.

It will, of course, be understood that various changes may be made in the form, details, arrangement and proportions of the parts, without departing from the scope of applicants' invention, which generally stated, consists in a device capable of carrying out the objects above set forth, in the novel parts and combinations of parts disclosed and defined in the appended claims.

What is claimed is:

1. A device of the class described, comprising a casing, a rotating disk in said casing having a multiplicity of spaced diverging ribs formed on either side thereof, said ribs being spaced at their inner ends, means for feeding material at either side of said member to the inner ends of said ribs, a member at the outer side of and spaced from said disk and ribs, against which the material is thrown by said ribs, and an outlet means on said casing.

2. A device for hulling oats and operating upon other stock food material having in combination, a casing, a shaft extending therethrough, a disk carried by said shaft, a multiplicity of spaced ribs carried on both sides of said disk, said ribs being separated at their inner ends and diverging therefrom, disks spaced respectively at either side of said first mentioned disks and overlying the ribs thereon, means for feeding material between said disks and the inner ends of said ribs, and a member surrounding said disks and ribs against which the material is thrown for hulling the same, and an outlet conduit leading from said casing.

3. A machine for hulling oats and operating on similar material comprising a casing, a shaft extending therethrough, a disk carried on said shaft, ribs carried on either side of said disk, said ribs being spaced at their inner ends and diverging outwardly therefrom, disks at either side of said disk having central openings therein and overlying said ribs, said ribs terminating substantially at the edge of said openings in said disks, means for feeding material into said casing at either side thereof and into the openings in said disks to be received between said disks and the inner ends of said ribs, a ring surrounding and spaced from said disks against which the material is thrown by said ribs, said casing being wider than the distance between said last mentioned disks and said ring, whereby material can discharge at either side of said ring, and a discharge conduit leading from said casing.

4. A machine for hulling oats and operating on similar material comprising a casing, a shaft extending therethrough, a disk carried on said shaft, ribs carried on either side of said disk, said ribs being spaced at their inner ends and diverging laterally therefrom, disks at either side of said disk having central openings therein and overlying said ribs, said ribs terminating substantially at the edge of said openings in said disks, means for feeding material into said casing at either side thereof and into the openings in said disks to be received between said disks and the inner ends of said ribs, a ring surrounding and spaced from said disks against which the material is thrown by said ribs, a discharge conduit leading tangentially from said casing, said casing diverging from said ring from adjacent one side of said outlet to the other side of said outlet.

5. A machine for hulling oats and operating on other stock food material comprising a casing having substantially vertical sides, a shaft extending horizontally therethrough, a disk carried on said shaft disposed substantially centrally between the sides of said casing, ribs carried on both sides of said disk, said ribs having their inner ends spaced and diverging from said inner ends, annular disks disposed respectively at each side of said disk and covering the ribs thereon, a ring surrounding said disks and ribs, means for feeding material at either side of said casing between said central disk and said last mentioned disks, a discharge conduit leading from said casing, the end of said casing between said vertical sides being disposed adjacent said discharge outlet at one side thereof and diverging away from said ring around the same to the other side of said discharge outlet.

6. A device for hulling oats and operating upon other stock food material having in combination, a casing, a shaft extending therethrough, a disk mounted on said shaft having ribs at either side carried thereby spaced at their inner ends and diverging therefrom, disks at either side of said disks overlying said ribs, means for directing material at either side of said first mentioned disks between the same and said last mentioned disks, a ring surrounding said disks against which the material is thrown, and an outlet conduit leading from said casing, said ring extending across the opening in said outlet conduit.

7. A device for hulling oats and operating upon other stock food material having in combination, a casing, a shaft extending therethrough, a disk carried by said shaft having a plurality of spaced diverging ribs formed on either side thereof, said ribs being spaced at their inner ends, means for feeding material at either side of said disk, and means at the outer ends of said ribs against which the material is thrown thereby, and an outlet means on said casing leading from both sides of said means.

8. A device for hulling oats and operating upon other stock food material having in combination, a casing, a shaft extending therethrough, a disk carried by said shaft, a plurality of diverging spaced ribs on said disk separated at their inner ends, a member surrounding said disk against which material is thrown by said ribs, an outlet conduit for said casing at one side of said disks, the side of said casing surrounding said disk being closely adjacent to said last mentioned member at one side of said conduit, and a greater distance from said disk at the other side of said conduit.

9. A device for hulling oats and operating upon other stock food material having in combination, a casing having substantially vertical sides, a shaft extending horizontally through said casing, a vertically disposed disk carried by said shaft, a plurality of spaced ribs carried by said disk, said ribs being separated at their inner ends and diverging therefrom, a ring surrounding said disk and ribs against which material is thrown by said ribs, the wall of said casing between said sides being curved and disposed closely adjacent said ring at one point, but diverging from said ring, and an outlet conduit leading from said wall at one side of said casing.

10. A device for hulling oats and operating upon other stock food material having in combination, a casing, a shaft extending therethrough, a disk carried by said shaft, a plurality of spaced ribs on said disk, said ribs being separated at their inner ends and diverging therefrom, a ring surrounding said disk and ribs, means for feeding material to the inner ends of said ribs, a movable member having a portion disposed closely adjacent the inner ends of said ribs for clearing obstructions therefrom, and means for holding said member in a definite position and returning the same to said position.

11. A machine of the class described comprising a substantially cylindrical casing, a substantially horizontal shaft extending axially through said casing, a disk secured to said shaft within said casing, a plurality of ribs at either side of said disk disposed at the ally therefrom, said ribs being separated at their inner ends and diverging outwardly therefrom, annular disks overlying said ribs, means extending through the sides of said casing for feeding material between said ribs and disks, and a ring secured to the wall of said casing and spaced from said disks against which the material is thrown, said casing having an outlet conduit extending tangentially therefrom through which the material acted upon is discharged.

12. A machine of the class described having in combination, a base, a cylindrical casing carried thereby having a substantially horizontal axis, bearings secured at either side of said casing extending outwardly therefrom, a shaft journaled in said bearings and extending through said casing, a disk carried by said shaft eccentrically to said casing, a disk carried by said first mentioned disk and spaced laterally therefrom and having a central opening therein, a plurality of outwardly diverging ribs between said disks having their inner ends substantially at the edge of said opening, a hopper extending through one side of said casing for feeding material through said opening between said disks and ribs, and a ring secured to the inner wall of said casing surrounding said disks against which the material is thrown, said casing having a discharge conduit leading therefrom.

13. A device for hulling oats and operating upon other stock food material, having in combination a casing of comparatively small width having vertical sides, a shaft extending horizontally through said casing, a disc secured to said shaft and rotatable therewith in a vertical plane, said disc having a multiplicity of spaced ribs at either side thereof extending outwardly from adjacent its center, a ring in said casing surrounding said disc and spaced a short distance from the edge thereof, said ring being of much less width than said casing, means for feeding material to the opposite sides of said disc so that said material is thrown outwardly by the ribs on said disc against said ring, and an outlet conduit leading from said casing.

In testimony whereof we affix our signatures.

JAMES H. MOTT.
CARL C. GRAY.